Oct. 25, 1927.
J. WINKLER
1,647,110
PERMUTATION AUTOMOBILE WHEEL LOCK
Filed March 14, 1925
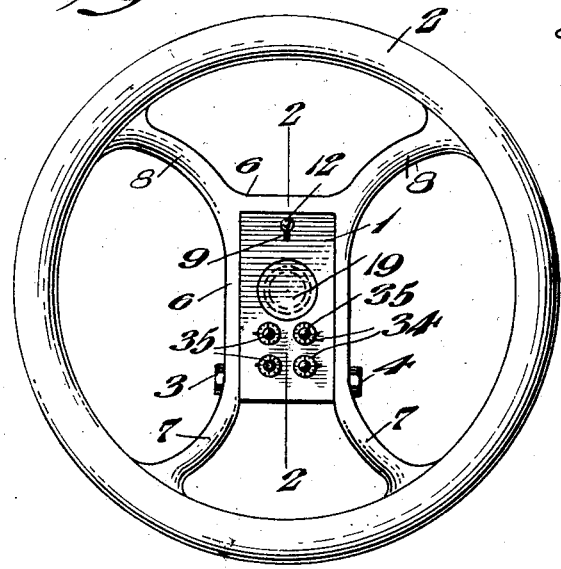
Fig. 1.
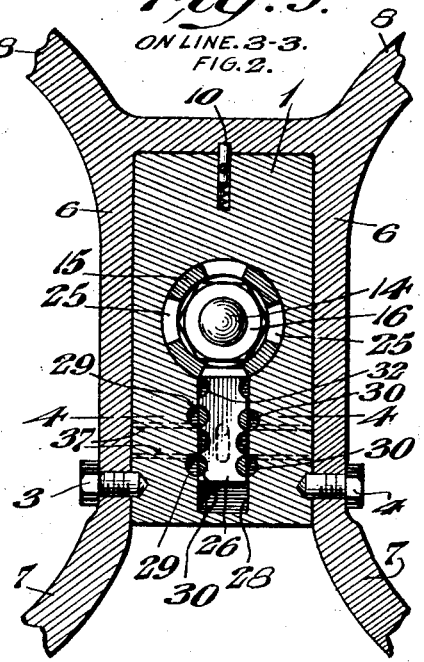
Fig. 3.
ON LINE. 3-3.
FIG. 2.
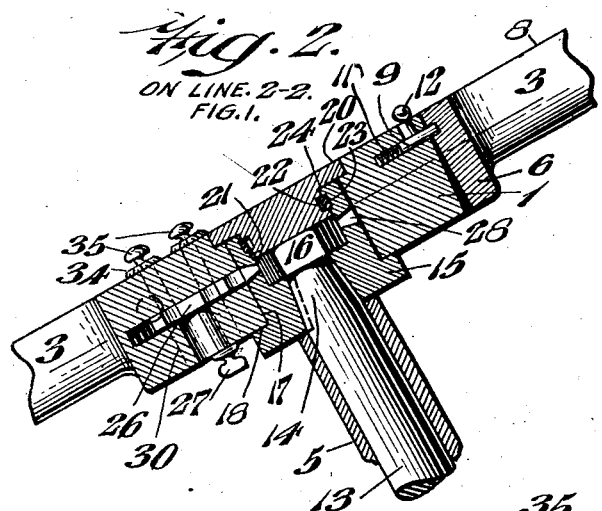
Fig. 2.
ON LINE. 2-2.
FIG. 1.
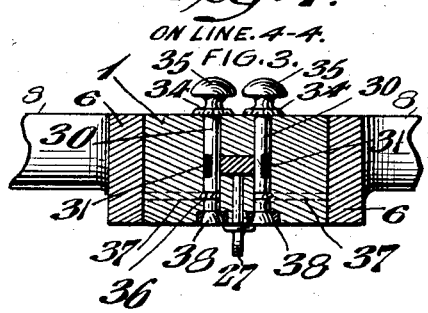
Fig. 4.
ON LINE. 4-4.
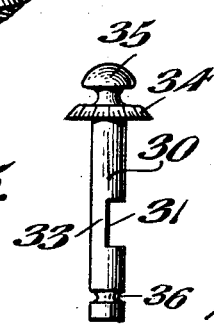
Fig. 5.
INVENTOR:
John Winkler.
BY
ATTORNEYS.

Patented Oct. 25, 1927.

1,647,110

UNITED STATES PATENT OFFICE.

JOHN WINKLER, OF PHILADELPHIA, PENNSYLVANIA, ASSIGNOR OF ONE-HALF TO CHESTER A. BILLETDOUX, OF PHILADELPHIA, PENNSYLVANIA.

PERMUTATION AUTOMOBILE WHEEL LOCK.

Application filed March 14, 1925. Serial No. 15,445.

My invention relates to a new and useful automobile wheel lock adapted to be operated without the aid of any key or the like, by means of a series of revolving tumblers adapted to be turned into engaging and disengaging positions with respect to a sliding bolt, which may thereby be fixed in either the locked or unlocked position.

My invention further relates to a novel combination of a permutation lock of the character stated, with a steering wheel mechanism of an automobile, whereby the automobile steering wheel may be disconnected from the steering rod or post, by the withdrawal of a sliding bolt; and whereby the automobile may be locked by fixing said sliding bolt in such disengaging or disconnected position, thereby making it impossible to steer a car, due to the lack of engagement between the steering wheel and steering rod.

My invention further relates to a novel combination of permutation locking device with the steering wheel of an automobile which is adapted to be deflected from its normal plane, so as to provide added clearance for the driver of the car in entering or leaving the car.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings in which like reference characters indicate like parts:—

Fig. 1 represents a plan view of an automobile lock wheel embodying my invention.

Fig. 2 represents a section on line 2—2 of Fig. 1.

Fig. 3 represents a section on line 3—3 of Fig. 2.

Fig. 4 represents a section on line 4—4 of Fig. 3.

Fig. 5 represents a view in elevation on an enlarged scale of one of the permutation tumblers.

Referring to the drawings, 1 designates the hub block of the steering wheel 2, having the steering wheel pivoted thereto on the pivot pins or bolts 3 and 4. In order to permit the deflection of the steering wheel rim 2, with respect to the steering column 5, there is provided a yoke 6, surrounding the hub block 1, formed integral with spokes 7 and 8. In order to lock the steering wheel 2 in the steering or normal position thereof shown in the figures, I provide a spring bolt 9, within the block 1, and a corresponding recess 10 in the yoke portion 6 of the steering wheel; which bolt 9 is actuated by the spring 11, and may be withdrawn against the tension of said spring, by the knob 12. The steering post or rod 13 is provided with a tapered and key slotted end 14, onto which is secured rigidly, the collar 15, by means of a suitable key and nut 16. The collar 15 is provided with a circular or cylindrical surface 17, above the shoulder 18, on which cylindrical surface 17, the hub block 1 is rotatably mounted, as shown particularly in Fig. 2. In order permanently to fix the hub block 1, to the collar 15, I provide a plug 19, having the flange 20 extending over the hub block 1, and adapted to fit into the recess 21 of said collar 15. The plug 19, and the recess 21 of the collar 15, are provided with corresponding annular grooves 22 and 23 into which corresponding grooves is inserted, during the assembly of the wheel, an expansive metallic ring 24, which expands into the groove 23, thereby locking the plug 19 permanently in the position shown in Fig. 2, yet permitting the hub block 1 and hence the wheel 2, to revolve freely about the collar 15.

In order to obtain a positive engagement between the collar 15, and the steering wheel 2, and hence between the steering rod 13 and the wheel, there are provided a plurality of radial slots or openings 25, in the cylindrical wall of the collar 15, into which slots the bolt 26 is adapted to enter. Thus in order to obtain an operative or steering engagement between the wheel 2 and steering rod 13, the bolt 26, with the aid of the knob 27, is moved towards the steering rod 13, into one of the slots 25. By withdrawing the bolt 26 from the slot 25, the engagement between the steering rod 13, and the wheel 2 is broken and the car cannot be steered or controlled, thus locking the car in an inoperative position.

In order to enable the bolt 26 to be locked in its engaging or disengaging positions, I provide a number of round openings in the hub block, perpendicular to the bolt, and on the edge of the bolt and the edge of the recess 28 within which the bolt slides. Into each of these openings 29, I insert a proper size tumbler 30 having approximately one half of its circular body cut away at a point in alignment with the bolt 26, thereby permitting said bolt to slide within said recess 28 only when the tumblers are all turned with the flat faces 31 thereof, parallel to the edge of the bolt 26. By providing corresponding semi-circular recesses 32 in the edge or edges of the bolt 26, for receiving the tumblers 30 in two positions thereof, the bolt 26 may be locked in either one or two extreme positions, by merely turning one or several of the tumblers 30 until the semi-circular body portions 33, engage or enter the corresponding semi-circular recess 32.

In order to permit the proper setting of the tumblers 30, so as to unlock the bolt 26, each of the tumblers is provided with a dial 34, and an operating knob 35, by means of which dial, and the graduations thereon, the tumblers may be so positioned, as to align the flat faces 31 thereof, parallel with the edge of the bolt 26. Thus in order to lock the machine, namely to disengage the wheel 2 from the collar 15, and hence from the steering post 13, it is only necessary to withdraw the bolt 26 from the slot 25 and to turn one or several of the tumblers 30, into any position other than their "open" position, thereby causing the tumbler to enter the semi-circular recess 32 in the bolt 26, thereby positively retaining said bolt in its outer "locked" or disengaging position. While in this position, it is readily seen, the car cannot be controlled, since it is impossible to engage or effect any engagement with the steering post 13. In order to unlock the car, the operation is merely reversed, by sliding the bolt inwardly toward the center into one of the slots 25, and fixing the same in that position by simply turning one or several of the tumblers 30 into the corresponding semi-circular recess 32.

In order to retain and fix within the block 1, in a permanent manner, the tumblers 30, I may provide a slight annular groove 36, which groove may be engaged by a pin 37 driven into a corresponding opening in the block, positioned in alignment with said annular groove. By cutting the end of the pin 37 flush with the outer wall of the block 1, the pin 37 is permanently fixed therein, thereby permanently retaining the tumblers 30 in the block 1. In order further to secure the tumblers 30, permanently in the block 1, I may also provide small collars or discs 38, recessed within the block 1, which may be riveted or otherwise permanently attached to the ends of the tumblers 30.

It will now be apparent that I have devised a novel and useful permutation automobile wheel lock which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent is:—

1. In an automobile lock, a steering post, a collar fixedly secured to the end thereof, a hub block journaled on said collar, a plug permanently securing said hub block to said collar, the latter having a plurality of engaging recesses therein, a sliding bolt carried by said block, and adapted to engage one of said recesses, said bolt having a recess in the edge thereof, a tumbler rotatably mounted in said block in alignment with said recess, and having a recess therein in alignment with said bolt, whereby the bolt may be retained in one of several positions, by turning said tumbler into said recess in the bolt, and means at the lower end of said tumbler for preventing withdrawal thereof.

2. In an automobile lock, a steering post, a collar permanently secured to the upper end thereof, a hub block rotatably mounted on said collar, a locking plug entering the upper end of said collar, and permanently engaging the same and the hub block, a radially disposed sliding bolt carried by said hub block, said collar having an engaging recess in alignment with said bolt, a handle carried by said bolt, the latter having a plurality of recesses in the edge thereof, a tumbler rotatably mounted within said block, in alignment with one of said recesses of said bolt, said tumbler being recessed in alignment with the bolt, so as to lock said bolt in one of several positions thereof, by rotating said tumbler into one of said recesses and whereby the bolt may be unlocked by aligning said tumbler with the edge of said bolt, and means engaging the lower end of said tumbler for preventing its withdrawal.

3. In an automobile lock, a steering post, a collar permanently secured to the upper end thereof, a hub block rotatably mounted on said collar, a locking plug entering the upper end of said collar, and permanently engaging the same and the hub block, a radially disposed sliding bolt carried by said hub block, said collar having an engaging recess in alignment with said bolt, a handle carried by said bolt, the latter having a plurality of recesses in the edge thereof, a tumbler rotatably mounted within said block, in alignment with one of said recesses of said bolt, said tumbler being recessed in alignment with the bolt, so as to lock said bolt in one of several positions thereof, by rotating said tumbler into one of said recesses and whereby the bolt may be unlocked by aligning said tumbler with the edge of said bolt, a dial carried by said tumbler at the surface of said block, for indicating the aligning positions of the same, and means at the lower end of said tumbler for preventing its withdrawal.

4. In an automobile lock, a steering post, a collar permanently secured to the upper end thereof, a hub block rotatably mounted on said collar, a locking plug entering the upper end of said collar, and permanently engaging the same and the hub block, a radially disposed sliding bolt carried by said hub block, said collar having an engaging recess in alignment with said bolt, a handle carried by said bolt, the latter having a plurality of recesses in the edge thereof, a tumbler rotatably mounted within said block, and in alignment with one of said recesses of said bolt, said tumbler being recessed in alignment with the bolt, so as to lock said bolt in one of the several positions thereof by rotating said tumbler into one of said recesses, and whereby the bolt may be unlocked by aligning said tumbler with the edge of said bolt, and means at the lower end of the tumbler permanently to lock said tumbler within said block.

5. In an automobile wheel lock, a steering post, a collar fixedly secured to the end thereof, a hub block journaled on said collar, a plug permanently securing said hub block to said collar, the latter having a plurality of engaging recesses therein, a sliding bolt carried by said block, and adapted to engage one of said recesses, and having a recess in the edge thereof, a tumbler rotatably mounted in said block in alignment with said recess, and having a recess in alignment with said bolt, whereby the bolt may be retained in one of several positions, by turning said tumbler into said recess in the bolt, and in combination therewith, means at the lower end of said tumbler for preventing its withdrawal, a yoke pivotally mounted on said block at a right angle to the steering rod and a steering wheel carried by said yoke through a plurality of spokes.

JOHN WINKLER.